US010258535B2

(12) United States Patent
Lem et al.

(10) Patent No.: US 10,258,535 B2
(45) Date of Patent: Apr. 16, 2019

(54) VEHICLE SEAT WITH MUSCLE MASSAGE SYSTEM

(71) Applicant: Ford Global Technologies, LLC, Dearborn, MI (US)

(72) Inventors: Jeroen Lem, Maastricht (NL); Joseph August Himmel, IV, Livonia, MI (US); Michael Kolich, Windsor (CA); Jessica Rausch, Moenchengladbach (DE); Amber LaVerne Hall, Oak Park, MI (US); Brian Boland, Pinckney, MI (US); Michael Medoro, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 852 days.

(21) Appl. No.: 14/616,921

(22) Filed: Feb. 9, 2015

(65) Prior Publication Data

US 2016/0229320 A1 Aug. 11, 2016

(51) Int. Cl.
*A61H 9/00* (2006.01)
*B60N 2/90* (2018.01)

(52) U.S. Cl.
CPC ............ *A61H 9/0078* (2013.01); *B60N 2/914* (2018.02); *B60N 2/976* (2018.02); *A61H 2201/0149* (2013.01); *A61H 2201/5002* (2013.01)

(58) Field of Classification Search
CPC ........ A61H 9/00; A61H 9/005; A61H 9/0078; A61H 2201/0134; A61H 2201/0138; A61H 2201/0149
See application file for complete search history.

(56) References Cited

U.S. PATENT DOCUMENTS

| 5,135,282 | A | * | 8/1992 | Pappers | B60N 2/4415 297/284.3 |
| 6,551,450 | B1 | * | 4/2003 | Thomas | A61H 9/0078 156/580.1 |
| 8,616,654 | B2 | | 12/2013 | Zenk et al. | |
| 9,259,098 | B2 | * | 2/2016 | Williams | A47C 27/088 |
| 2004/0097854 | A1 | * | 5/2004 | Hester | A61H 23/04 601/149 |
| 2006/0049678 | A1 | | 3/2006 | Kern et al. | |
| 2010/0031449 | A1 | | 2/2010 | Cheng | |
| 2012/0032478 | A1 | * | 2/2012 | Friderich | B60N 2/448 297/180.1 |
| 2016/0200228 | A1 | * | 7/2016 | Saren | A61H 9/0078 601/150 |

\* cited by examiner

*Primary Examiner* — Michael J Tsai
(74) *Attorney, Agent, or Firm* — Vichit Chea; Price Heneveld LLP

(57) ABSTRACT

A vehicle seat includes a cushion and a seatback coupled with the cushion. The vehicle seat further includes a first set of independently inflatable massage bladders coupled within the seatback. The massage bladders of the first set are arranged to extend diagonally from adjacent a center line of the seatback at a first vertical location toward a first lateral side of the seatback at a second vertical location above the first location.

18 Claims, 7 Drawing Sheets

VEHICLE SEAT WITH MUSCLE MASSAGE SYSTEM

FIELD OF THE INVENTION

The present invention generally relates to a vehicle seat having bladders for implementing a massage function. In particular, the bladders are provided in various groups of diagonally-arranged individual bladders.

BACKGROUND OF THE INVENTION

Various types of motor vehicle seats have been developed that are capable of implementing various types of massage. Some vehicle seats implement massage by using various structures, such as air bladders or other mechanically-actuated features thereof, that are present in the seat for purposes of seat position adjustment. Such seats actuate such portions to produce a massage that is based on applying general pressure to regions of the back, for example, that actively induce posture changes over time. While such a seat massage may provide benefits over time, it is not actually a reasonable simulation of an actual massage by a person.

Other massage seats may include dedicated massage features that can move inward and outward with respect to the seating surface to provide localized pressure in various areas of the back, for example. However, no such seats implement a massage function that can apply moving pressure over a muscle or muscle group that can at least simulate a stretching of the muscle along a direction thereof. Accordingly, further advances may be desired in which a vehicle seat includes structures capable of simulating movement over a portion of an occupant's body.

SUMMARY OF THE INVENTION

According to one aspect of the present invention, a vehicle seat includes a cushion and a seatback coupled with the cushion. The vehicle seat further includes a first set of independently inflatable massage bladders coupled within the seatback. The massage bladders of the first set are arranged to extend diagonally from adjacent a center line of the seatback at a first vertical location toward a first lateral side of the seatback at a second vertical location above the first location.

According to another aspect of the present invention, a vehicle seat includes a cushion and a seatback coupled with the cushion. The vehicle seat also includes a massage system having a first set of massage bladders coupled within one of the cushion and the seatback. The massage bladders within the first set are arranged along a diagonal extending within the one of the cushion and the seatback. The massage system also includes a pump respectively coupled with the massage bladders of the first set and in fluidic communication therewith and a valve module coupled between the pump and the massage bladders of the first set. The valve module includes a plurality of valves respectively associated with each of the massage bladders of the first set. A controller is coupled with the pump and the valve module and is programmed to cause individual inflation and deflation of selected ones of the massage bladders of the first set according to a massage sequence.

According to another aspect of the present invention, a method for implementing a massage sequence in a vehicle seat includes causing inflation, to a first predetermined inflation level, of a first bladder in a first location within the vehicle seat. The method further includes, after a time interval, causing deflation of the first bladder and, when the first bladder passes a first deflation threshold level, causing inflation of a second bladder positioned within the vehicle seat in a second location adjacent and diagonal to the first location.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
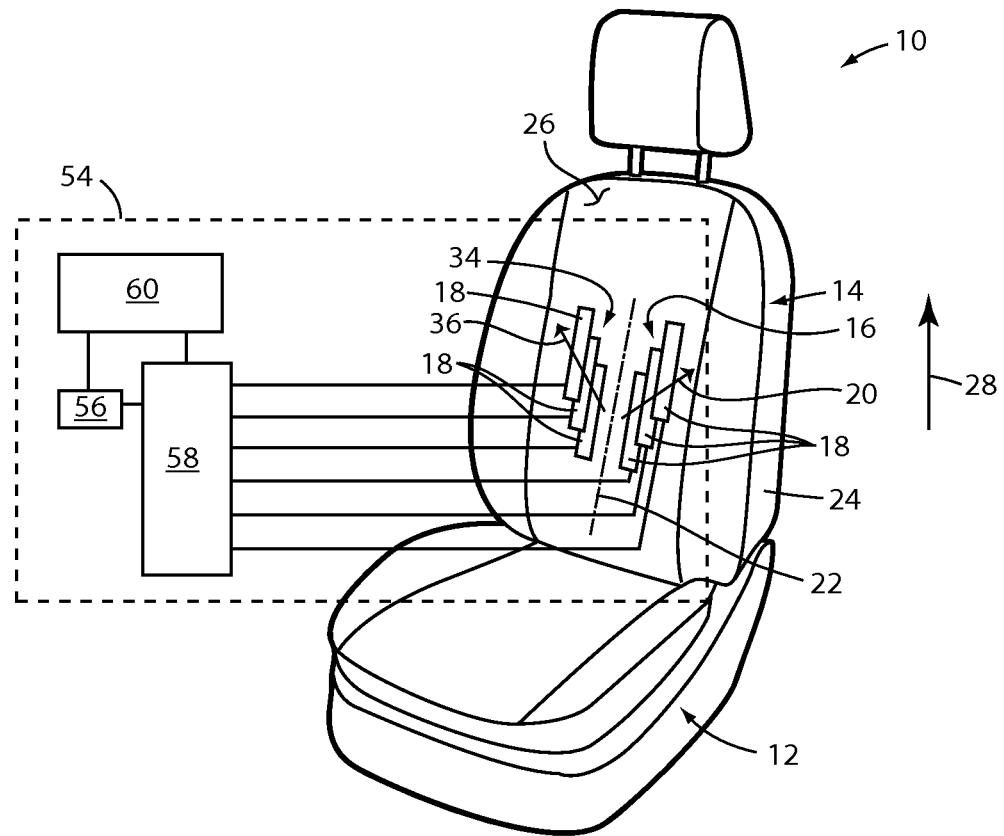
FIG. 1 is a front-perspective view of a vehicle seat with a massage system.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIG. 1, reference numeral 10 generally designates a vehicle seat. Vehicle seat 10 includes a cushion 12 and a seatback 14 coupled with the cushion 12. Seat 10 further includes a first set 16 of massage bladders 18 (which is illustrated as including three such bladders 18, although more or fewer bladders 18 can be included in any given set) coupled within seatback 14. The massage bladders 18 of the first set 16 are arranged to extend diagonally (e.g. along diagonal 20) from adjacent a center line 22 of seatback 14 at a first location (e.g. the location corresponding with bladder 18*a*) toward a first lateral side 24 of seatback 14 at a second location (e.g. a location corresponding to bladder 18*c*) above the first location. The massage bladders 18 in the first set 16 are independently inflatable and deflatable with respect to one another.

As shown in FIG. 1, first set 16 of massage bladders 18 can be positioned within seatback 14 in an appropriate location to implement a massage function (as described further below) applied to the back of an occupant 8 (FIG. 3) of seat 10, with the back of occupant 8 appropriately supported by seatback 14 when seated on cushion 12. Although depicted generally schematically in FIG. 1, massage bladders 18 can be coupled with an internal support structure (not shown) of seatback 14 that provides load-bearing support in a general shape for seatback 14. Further, massage bladders 18 can be positioned beneath and, optionally, in contact with, an outer cover stock 26 of seatback 14. Additionally or alternatively, further sets of bladders 18 can be located within seat cushion 12. Massage bladders 18 can be coupled with the support structure of seatback 14 either individually, such as by appropriate fasteners coupled with appropriately-positioned portions of such support structure. Alternatively, one or more sets 16 of bladders 18 can be coupled with a carrier (not shown) that is, in turn, coupled with the support structure of seatback 14.

Figures 2A, 2B:
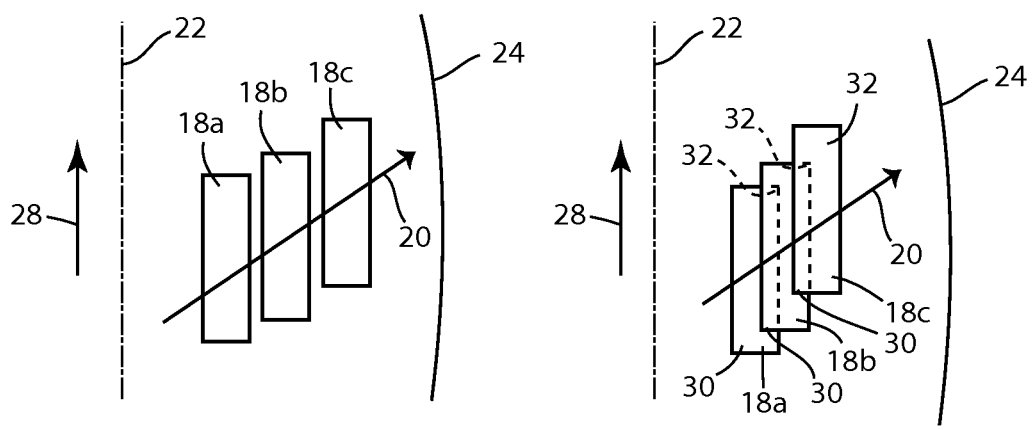
FIG. 2A is a schematic view of a set of massage bladders that can be included within the massage system of FIG. 1.
FIG. 2B is a schematic view of an alternative set of massage bladders that can be included within the massage system of FIG. 1.

As shown in FIGS. 2A and 2B, various configurations for the above-noted diagonal arrangement of massage bladders 18 within first set 16 are possible. As shown in FIG. 2A, in one such diagonal arrangement, bladders 18 within first set 16 can be arranged with a first one of such bladders 18*a* in a first position closest to center line 22 and at a lower most position in vertical direction 28. A second one of such bladders 18*b* can be in a second position that is farther away from center line 22 and, thus closer to lateral side 24 of seatback 14 and at a relatively higher position along vertical direction 28 as compared to bladder 18*a*. A still further one of such bladders 18*c* can be in a third position farther away from center line 22 then both bladder 18*a* and bladder 18*b* and at a still higher position along vertical direction 28. As such, bladders 18*a*, 18*b*, and 18*c* can be evenly spaced along diagonal 20, as shown in FIG. 2A.

In a further variation shown in FIG. 2B, an arrangement for bladders 18*a*, 18*b*, and 18*c*, can be generally similar to that which is shown in FIG. 2*a*, with bladder 18*a* positioned closest to center line 22 and in a lowermost position along vertical direction 28, and with subsequent bladders 18*b* and 18*c* being progressively positioned farther away from center line 22 and in increasing positions along vertical direction 28. In FIG. 2B, however, the bladders, 18*a*, 18*b*, and 18*c* are arranged in positions so as to overlap, successively (or sequentially), as they extend along diagonal 20. In such an arrangement, each of bladders 18*a*, 18*b*, and 18*c*, can be of a generally rectangular shape so as to define both a lower-inside corner 30 and a diagonally opposite upper-outside corner 32. Bladder 18*b* is positioned relative to bladder 18*a* such that the lower-inside corner 30 of bladder 18*b* overlies a portion of bladder 18*a* and, further, such that upper-outside corner 32 of bladder 18*a* underlies bladder 18*b*. Similarly, bladder 18*c* is positioned such lower-inside corner 30 thereof overlies a portion of bladder 18*b* and, further, such that upper-outside corner 32 of bladder 18*b* underlies a portion of bladder 18*c*. The amount and proportions of such overlapping may depend on a number of factors, including but not limited to the size of bladders 18*a*, 18*b*, and 18*c* as well as the vertical and lateral spacing thereof and the particular body part or location under consideration for the massage.

A further shown in FIG. 1, seat 10 can further include a second set 34 of bladders 18 grouped separately from bladders 18 in first set 16. In the example illustrated in FIG. 1, bladders 18 within second set 34 are positioned opposite center line 22 from first set 16 and extend along a diagonal 36 that is essentially a mirror-image of diagonal 20. As such, the individual bladders 18*d*, 18*e*, and 18*f* are positioned progressively away from center line 22 (in, for example, respective fourth, fifth, and sixth positions that correspond to the aforementioned first, second, and third positions) and toward a passenger lateral side 38 of seatback 14 and, further, in increasingly higher positions along vertical direction 28. Bladders 18*d*, 18*e*, and 18*f* in second set 34 can be of a similar size and configuration to bladders 18*a*, 18*b*, and 18*c* in first set 16, including the general shape of bladders 18 as well as the manner of arrangement along the respective diagonal 20 or 36 (e.g. non-overlapping or overlapping).

Figure 3:
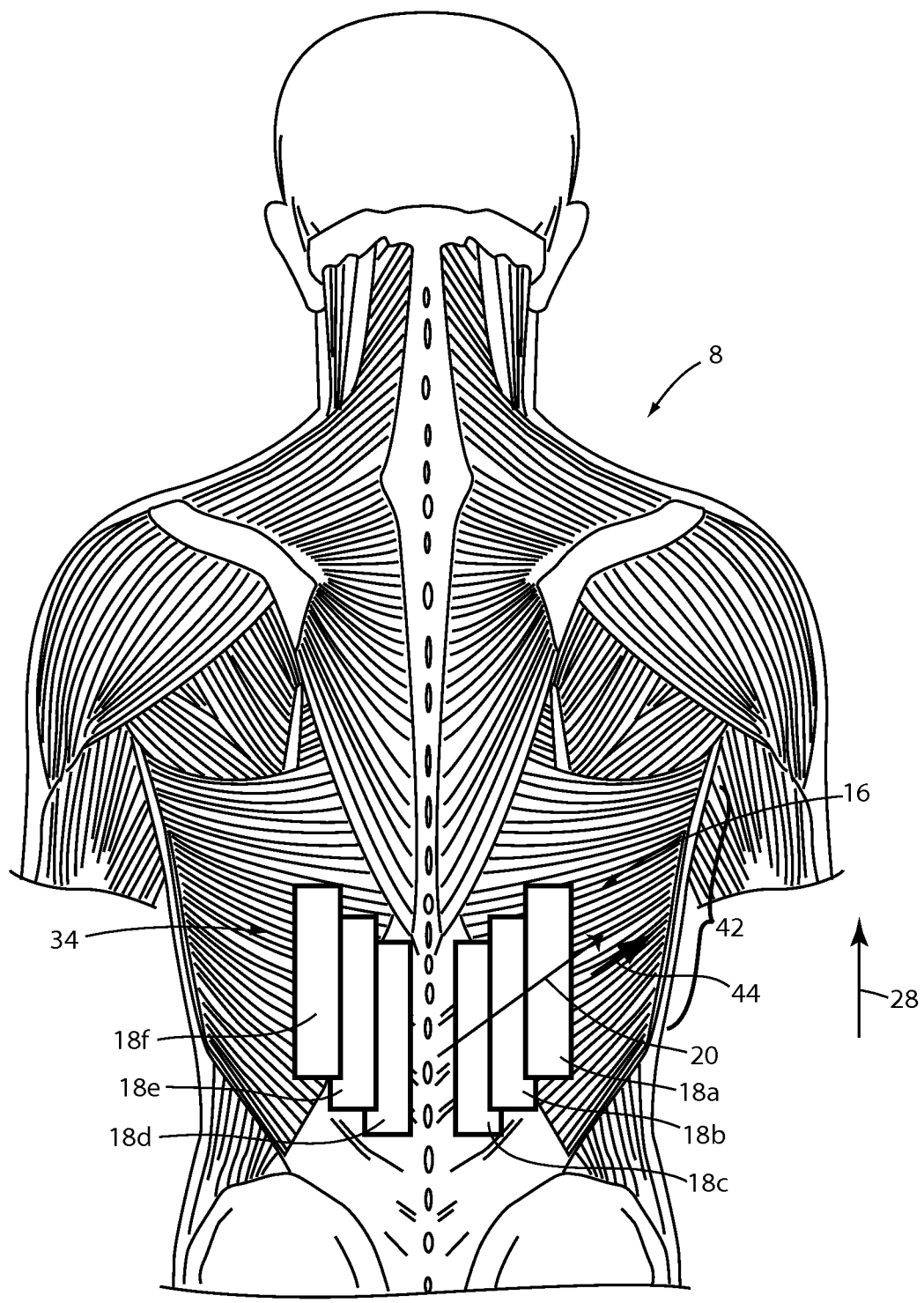
FIG. 3 is a schematic view of a plurality of massage bladder sets shown in connection with the back muscles of an occupant of the associated vehicle seat.

As shown schematically in FIG. 3, the arrangement of bladders 18 within respective sets 16 and 34 can be such that the respective diagonals 20 and 36 along which bladders 18 within first set 16 and second set 34, respectively, extend are generally aligned with a corresponding muscle group 42 within the back of occupant 8. Further, the respective diagonals 20 and 36 can match a general direction 44 along which the muscles in the respective first muscle group 42 extend. Such an arrangement can allow for bladders 18 within respective sets 16 and 34 to implement a massage action along certain ones of the muscles within the respective first group 42 that simulates translational movement (e.g. rubbing) of the muscles within the first group 42 along the direction 44 of extension of such muscles 42. In general, such a simulated translational massage action can be achieved by sequentially inflating and deflating bladders 18*a*, 18*b*, and 18*c* in first set 16 along diagonal 20 in a predetermined scheme, which is described further below. Such a scheme can be implemented simultaneously within the varying sets 16 and 34 of bladders 18 or separately, depending on the particular scheme and/or user input.

Returning to FIG. 1, a system 54 is illustrated in connection with the above-described vehicle seat 10. Such system 54 includes the above-described bladders 18, including those first set 16 and second set 34, respectively (which can be arranged as depicted in FIG. 1 or in alternative locations, such as those described in greater detail below). Within system 54 a pump 56 is fluidically coupled with the individual bladders 18 within seatback 14 via a valve module 58. In general, valve module 58 is fluidically connected with pump 56, which supplies compressed air thereto. Valve module 58 is then individually connected with the respective massage bladders 18 and, in one example, includes a series of electronically controllable valves (such as solenoid valves or the like) for selectively channeling a flow of compressed air as supplied by pump 56 to selected ones of the massage bladders 18, as needed or desired according to the implemented scheme. In other examples, valve module 58 can be constructed as a valve block of assembled, single valves or could be an assembly of several, smaller valve blocks. In the example shown in FIG. 1, wherein system 54 includes two mirror-image sets of bladders 16 and 34, a single valve can be associated with each of a pair of corresponding bladders, e.g. bladders 18*c* and 18*d* in FIG. 3, for simultaneous inflation and deflation of such bladders in a scheme. Alternatively, individual valves can be associated with each of the bladders, independently, with any simultaneous inflation and deflation (such as of corresponding bladders, e.g., bladders 18*c* and 18*d* in a mirror-image scheme) being implemented by controller 60.

In either such example, for implementation of a scheme system 54 further includes a controller 60 that is electronically coupled with both pump 56 for activation thereof, and with valve module 58 to implement a predetermined control of the internal valves therein. Controller 60 can be a stand-alone unit, complete with necessary user inputs (e.g. to turn the system 54 on or off, and to further optionally select various massage options or parameters). Alternatively controller 60 can be further electrically coupled with a control system of the associated vehicle such that activation thereof, as well as selection of a particular scheme or adjustment of particular parameters can be carried out by the vehicle control system, which in an example, can be the SYNC™ system available from Ford Motor Company of Dearborn, Mich.

Figure 4:
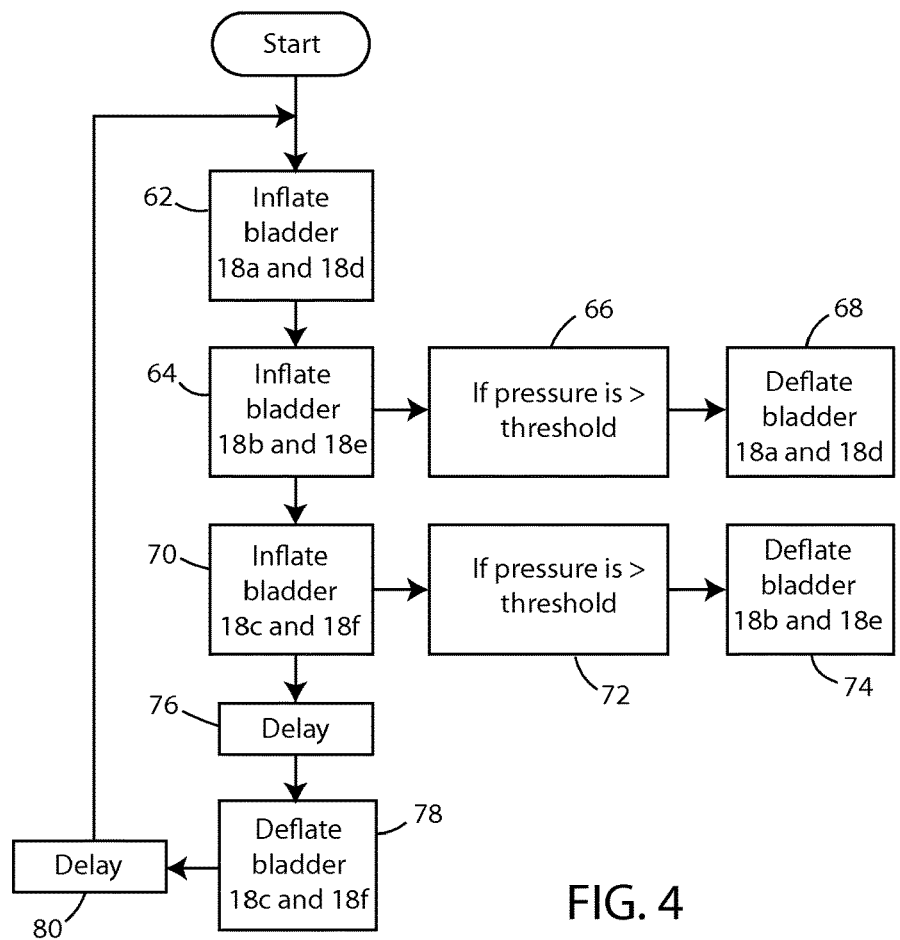
FIG. 4 is flow chart of a method for implementing a massage sequence that can be carried out by the system of FIG. 1.

An example of a scheme that can be implemented by system 54, according to control by controller 60 of both pump 56 and valve module 58 is illustrated in FIG. 4 and corresponds to a method of a further embodiment of the present invention. In the illustrated method, the respective bladders 18 within the sets 16 and 34 illustrated in FIG. 1, for example, are inflated and deflated according to a simultaneous mirror-image pattern described further below. In variations of vehicle seat 10 including additional or alternatively arranged sets of massage bladders 18 correspondingly varied implementations of a similar scheme can be used to implement similar massage functionality. Further, the depicted method can be varied to provide for simultaneous or staggered inflation of bladders 18 among the respective sets, such as sets 16 and 34 as depicted in FIG. 1.

According to the scheme depicted in FIG. 4, an example of a massage method begins, in step 62, with inflation of bladders 18*a* and 18*d* (i.e. the ones of bladders 18 within respective sets 16 and 34 that are positioned in the lowermost position along vertical direction 28 and are positioned closest to center line 22 of seatback 14). Once bladders 18*a* and 18*d* are inflated to a desired predetermined level, inflation thereof is stopped and bladders 18*a* and 18*b* are held at such a predetermined level. Subsequently, bladders 18*b* and 18*e* (i.e. the next bladders 18 along respective diagonals 20 and 36) are inflated in step 64. When a predetermined threshold level is passed by bladders 18*b* and 18*d*, bladders 18*a* and 18*d* are allowed to deflate, in step 66, such as by appropriate control of valve module 58 by controller 60. Such deflation of bladders of 18*a* and 18*d* continues while bladders 18*b* and 18*e* are continued to be inflated until such a time that bladders that 18*a* and 18*d* are completely deflated. Further, bladders 18*b* and 18*e* are continued to be inflated until such inflation thereof reaches a desired predetermined level.

During inflation of bladders 18*b* and 18*e*, and after a predetermined time interval after such inflation is initiated, bladders 18*c* and 18*f* are inflated in step 70. Once the inflation threshold of bladders 18*c* and 18*f* passes a predetermined threshold level in step 72, bladders 18*b* and 18*e* are deflated in step 74. Once bladders 18*c* and 18*f* are inflated to predetermined level, they are held at such a level during a delay in step 76, before deflation thereof in step 78. In such a manner bladders 18 are inflated within respective sets 16 and 34, thereof in a sequentially progressive inward/downward to outward/upward manner, i.e. along diagonals 20 and 36 to simulate the above-described translational movement along a particular location of the back of the occupant 8 of seat 10. The particular inflation and deflation profiles over time of bladders 18*a*, 18*b*, 18*c*, for example, as illustrated in FIG. 5 in which inflation of successive bladders 18 begins prior to in deflation of a previous bladder 18.

Figure 5:
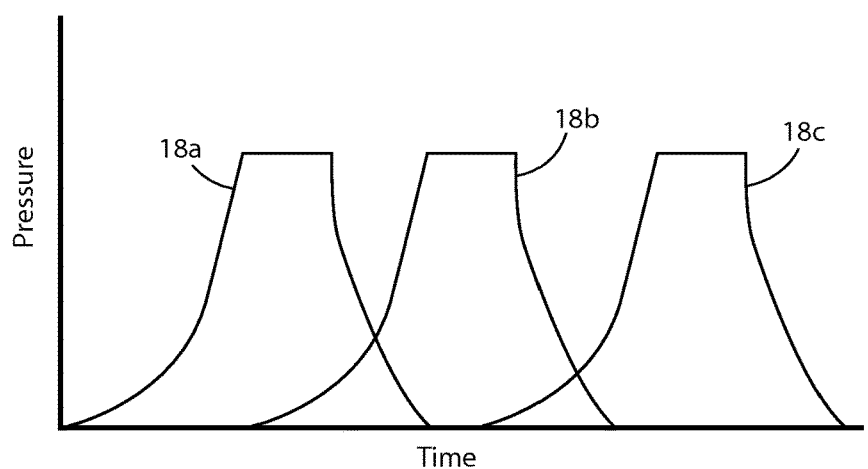
FIG. 5 is a graph showing bladder inflation levels achieved by the method of FIG. 4.

Arrangement of bladders 18 in an overlapping manner, as described above with respect to FIG. 2B can help to replicate the feeling of an object translating or rolling over the back of the occupant 8 of seat 10 according to the scheme depicted in FIGS. 4 and 5. In particular, during a particular interval within the sequence, bladder 18*b*, for example, may be in the initial stages of inflation thereof while bladder 18*a* is being deflated, meaning that overlapping bladders 18*a* and 18*b* may each be partially inflated during a portion of the depicted sequence. By positioning bladders 18*b* and 18*a* to overlap, the overlapping portions thereof, each being partially inflated, will provide an aggregate area that replicates full or near-full inflation of an individual bladder, such as bladder 18*a* or bladder 18*b* in a location between such bladders. A similar interval is present during the overlapping inflation of bladder 18*c* and deflation of bladder 18*b*.

Figure 6:
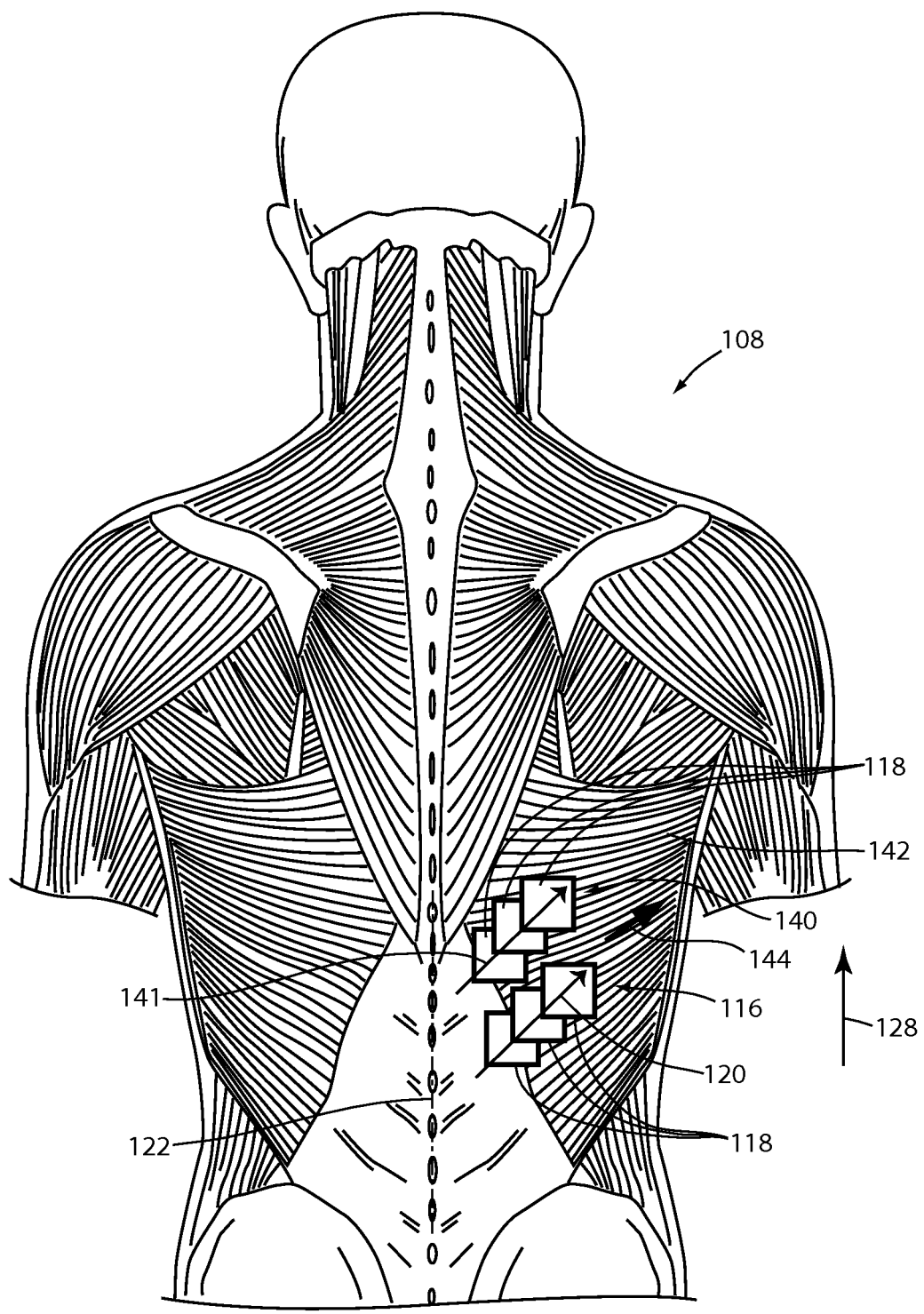
FIG. 6 is a schematic view of a plurality of alternative massage bladder sets shown in connection with the back muscles of an occupant of the associated vehicle seat.

As shown in FIG. 6, an alternative arrangement for multiple sets 116 and 140 of bladders 118, similar to those which are illustrated with respect to seat 10 and system 54 in FIG. 1, are illustrated in a vertically-staggered arrangement. In particular, a first set 116 of bladders 118*a*, 118*b*, and 118*c* are arranged along a first diagonal 20 in a similar arrangement to that which is shown in FIG. 2B, above, except that bladders 118 are generally square in shape. Such a square shape can result in smaller bladders 118 that effect more of a point-force effect during massage carried out therewith. A second set 140 is positioned on the same side of center line 122 of the corresponding seatback (not shown) and includes similar bladders 118*d*, 118*e*, and 118*f*, which are arranged along a second diagonal 141 that is generally parallel to first diagonal 120. A massage sequence using such sets 116 and 140 of the bladders 118 can be similar to that which is described above with respect to FIGS. 4 and 5. Alternatively, the bladders 118 within separate sets 116 and 140 can be sequentially inflated and deflated individually with respect thereto in an alternating, or staggered, fashion or on a sequential, set-by-set scheme.

Figure 7:
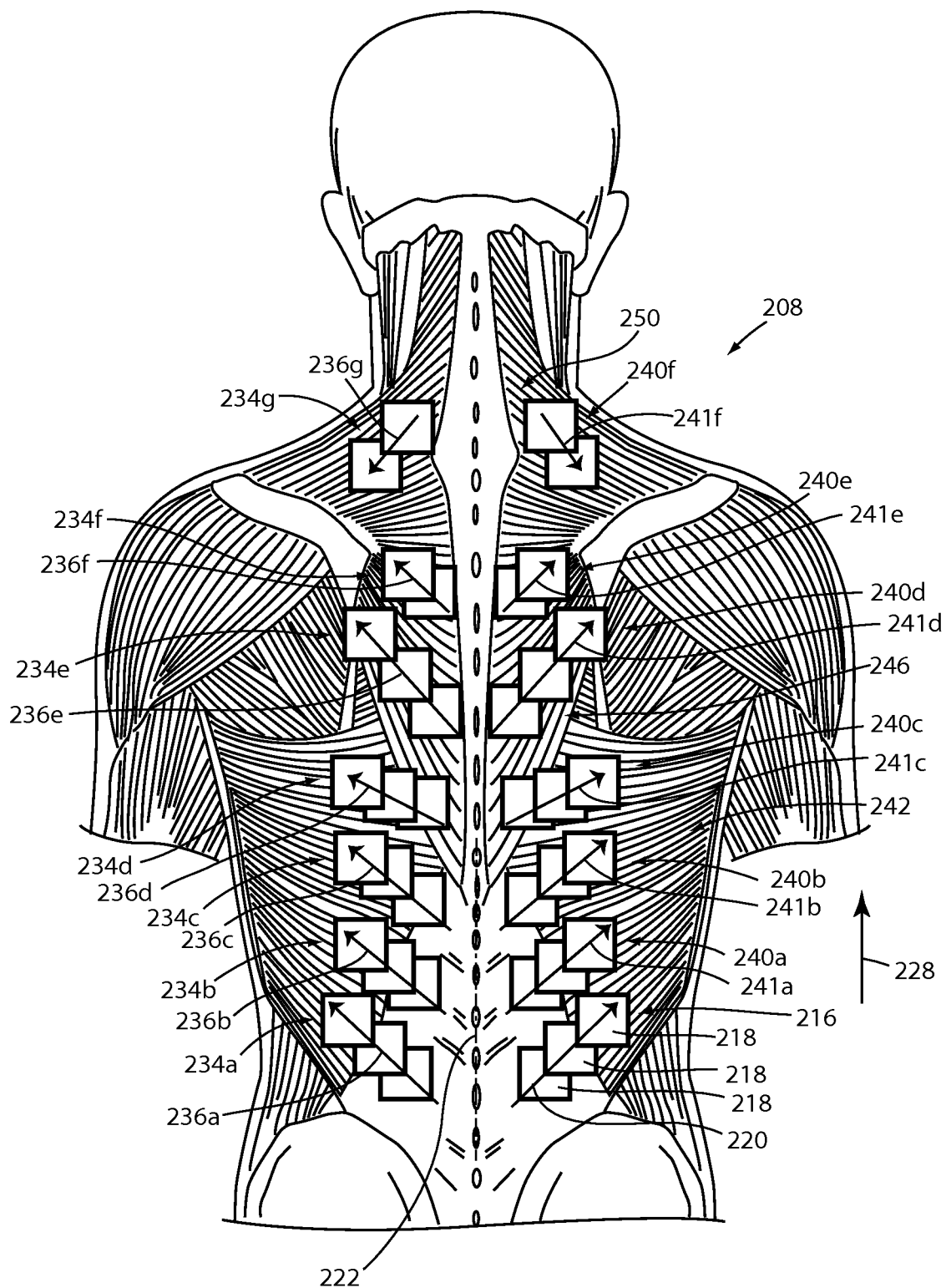
FIG. 7 is a schematic view of a further plurality of massage bladder sets shown in connection with the back muscles of an occupant of the associated vehicle seat.

As shown in FIG. 7, a further variation of an arrangement of massage bladders 218 within a system, such as system 54 illustrated with respect to seat 10 in FIG. 1, can include a plurality of different sets of bladders 218, including a set 216 generally similar, at least in arrangement, to that which is depicted in FIG. 2B, as well as FIG. 6. Additional sets of bladders can include a number of sets 240*a*-240*f* that extend above set 216 in vertical direction 228, each of such sets extending along respective diagonals 241*a*-241*f* that all extend outwardly from center line 22 toward the same lateral side (e.g. side 24 of seat 10) of a corresponding seatback (not shown). Further additional sets 234*a*-234*g* of bladders 218 can be positioned on an opposite side of center line 222 in a mirror-image arrangement with sets 216 and 240*a*-240*f*. In such an arrangement, various ones of the sets can be arranged to correspond with first muscle group 242 as described above with respect to FIG. 3, as well as with respect to additional muscle groups, such as muscle group 246 and muscle group 250. Such various sets 216, 234*a*-234*g*, and 240*a*-234*f* of massage bladders 218 can be used to implement different types of massages among different muscle groups or other areas of the back of an occupant 108 of the seat (e.g. seat 10) according to various modifications of the method discussed with respect to FIGS. 4 and 5.

Figure 8:
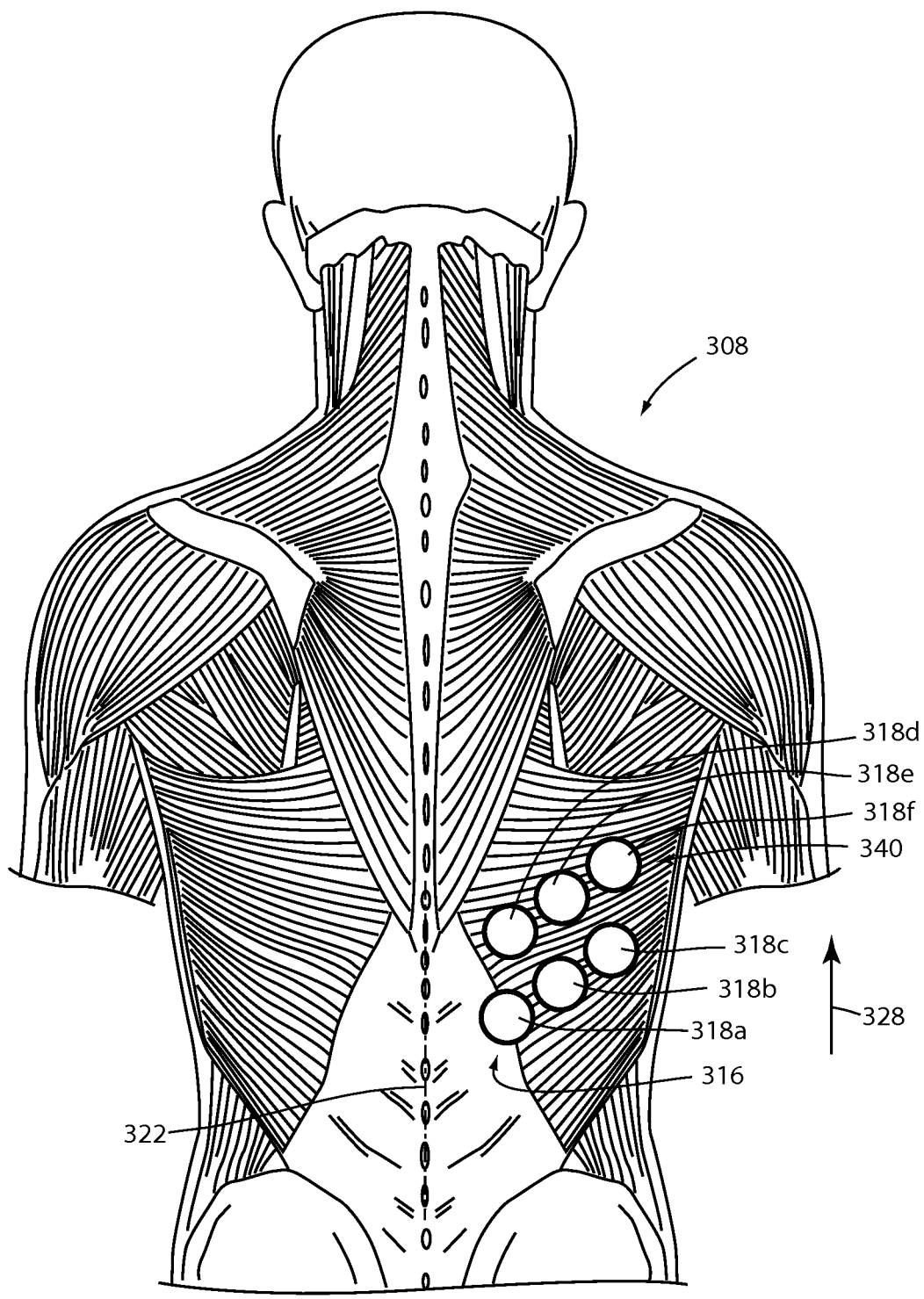
FIG. 8 a schematic view of a plurality of further alternative massage bladder sets shown in connection with the back muscles of an occupant of the associated vehicle seat.

As shown in FIG. 8, an additional arrangement can include bladders 318a-318f that are generally round in shape. Such bladders 318a-318f can be arranged in sets 316 and 340 extending along the same side of center line 322, as depicted in FIG. 8. Alternatively, such bladders 318a-318f can be arranged in sets on opposite sides of center line 222, in a manner similar to that which is described above. Further, such round bladders 318a-318f can be positioned in an overlapping manner, similar to that which is shown in FIG. 2B, as well as FIGS. 3 and 7.

Figure 9:
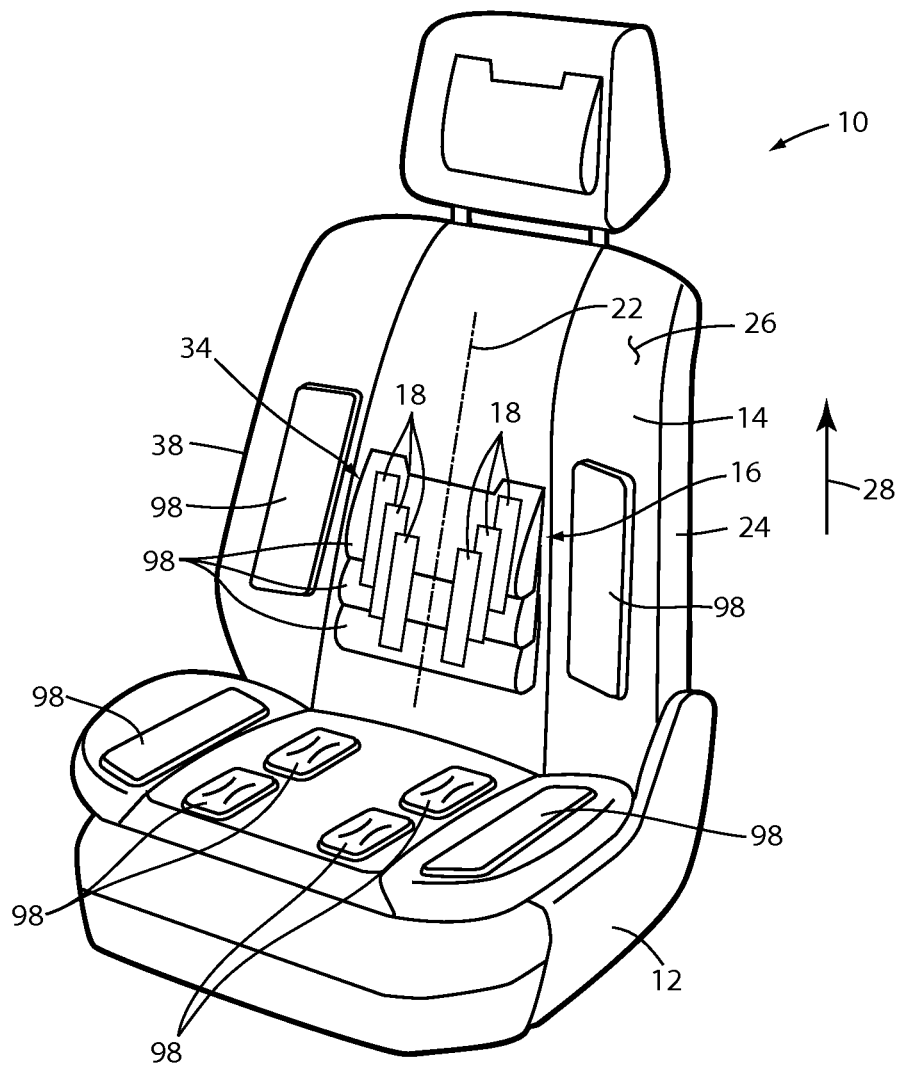
FIG. 9 is the vehicle seat of FIG. 1, showing additional seat adjustment bladders that can be included therewith.

As shown in FIG. 9, a massage system 54 including massage bladders 18 can be implemented in connection with a vehicle seat 10 that includes a plurality of seat configuration bladders 98 that are arranged at various locations among vehicle seat 10 and that can be inflated and deflated to alter the general configuration of the seating surfaces of the seat 10. In such an arrangement, massage bladders 18 can be positioned over the seat configuration bladder 98 such that massage bladders 18 can be used to implement a massage function regardless of the implemented configuration of seat 10 by inflation of seat configuration bladders 98.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

We claim:

1. A vehicle seat, comprising:
   a cushion;
   a seatback coupled with the cushion and defining a centerline;
   an inflatable seat adjustment bladder coupled with the seatback; and
   a first set of independently inflatable massage bladders coupled within the seatback, all of the massage bladders of the first set overlying the inflatable adjustment bladder being rectangular in shape so as to define a lower-inside corner and an upper-outside corner with respective first and second edges extending from the lower-inside corner, the first edge being parallel with the centerline of the seatback, and being arranged to extend diagonally from adjacent a center line of the seatback at a first vertical location toward a first lateral side of the seatback at a second vertical location above the first vertical location such that the lower inside corner of a second one of the massage bladders overlaps with the upper outside corner of a first one of the massage bladders with the respective first edges being parallel to and successively offset from each other away from the centerline.

2. The vehicle seat of claim 1, wherein the first set of massage bladders includes at least three massage bladders.

3. The vehicle seat of claim 1, wherein the first set of massage bladders are arranged in a sequentially overlapping manner.

4. The vehicle seat of claim 1, further including:
   a pump respectively coupled and in fluidic communication with the inflatable seat adjustment bladder and the massage bladders of the first set;
   a valve module coupled between the pump and the massage bladders of the first set, the valve including a plurality of valves respectively associated with each of the massage bladders of the first set; and
   a controller coupled with the pump and the valve module and programmed to cause individual inflation and deflation of selected ones of the massage bladders of the first set according to a massage sequence.

5. The vehicle seat of claim 1, further including:
   a second set of massage bladders coupled within the seatback and arranged to extend diagonally therein, the massage bladders of the second set being independently inflatable and deflatable.

6. The vehicle seat of claim 5, wherein the massage bladders of the second set are arranged to extend diagonally from adjacent the center line of the seatback at a third vertical location above the first vertical location toward the first lateral side of the seatback at a fourth vertical location above the second vertical location and the third vertical location.

7. The vehicle seat of claim 5, wherein the massage bladders of the second set are arranged to extend diagonally from adjacent the center of the seatback at the first vertical location toward a second lateral side of the seatback at the second vertical location.

8. The vehicle seat of claim 1, wherein:
seatback includes a support structure and a cover stock;
the seat adjustment bladder is coupled with the support structure; and
the massage bladders of the first set are coupled with the support structure and are positioned between and in contact with each of the seat adjustment bladder and the cover stock.

9. A vehicle seat, comprising:
a cushion defining a centerline;
a seatback coupled with the cushion;
a seat adjustment system including a first inflatable adjustment bladder within a one of the seatback and the cushion; and
a massage system, including:
  a first set of massage bladders coupled within the one of the cushion and the seatback, each of the massage bladders within the first set being rectangular in shape so as to define a lower-inside corner and an upper-outside corner with respective first and second edges extending from the lower-inside corner, the first edge being parallel with the centerline, overlying the first inflatable adjustment bladder and being arranged along a diagonal extending within the one of the cushion and the seatback from adjacent the centerline at a first vertical location toward a first lateral side of the seatback at a second vertical location above the first location such that the lower inside corner of a second one of the massage bladders overlaps with the upper outside corner of a first one of the massage bladders with the respective first edges being parallel to and successively offset from each other away from the centerline;
  a pump respectively coupled and in fluidic communication with the inflatable adjustment bladder and the massage bladders of the first set;
  a valve module coupled between the pump and the massage bladders of the first set, the valve module including a plurality of valves respectively associated with each of the massage bladders of the first set; and
  a controller coupled with the pump and the valve module and programmed to cause individual inflation and deflation of selected ones of the massage bladders of the first set according to a massage sequence.

10. The vehicle seat of claim 9, further including:
a second set of massage bladders coupled within the seatback and arranged to extend diagonally therein;
wherein the pump is further respectively coupled with the massage bladders of the second set and is in fluidic communication therewith, further wherein the valve module is further coupled between the pump and the massage bladders of the second set, and ones of the plurality of valves are further respectively associated with each of the massage bladders of the second set, and further wherein the controller is further programmed to cause individual inflation and deflation of selected ones of the massage bladders of the second set according to the massage sequence.

11. The vehicle seat of claim 10, wherein the first and second sets of massage bladders extend diagonally within a first side of the seat toward a first lateral side of the seat.

12. The vehicle seat of claim 10, wherein the first set of massage bladders extends diagonally within a first side of the seat toward a first lateral side of the seat, and further wherein the second set of massage bladders extends diagonally within a second side of the seat toward a second lateral side of the seat.

13. The vehicle seat of claim 9, wherein the massage bladders of the first set are positioned within a first location along the seatback, the first location being selected to correspond with a muscle group of the back of an occupant, and further wherein the diagonal is selected to correspond with a direction of extension of the muscle group.

14. A method for implementing a massage sequence in a vehicle seat, comprising:
causing inflation, to a first predetermined inflation level, of a first bladder in a first location within the vehicle seat;
after a time interval, causing deflation of the first bladder; and
when the first bladder passes a first deflation threshold level, causing inflation of a second bladder positioned within the vehicle seat in a second location adjacent and diagonal to the first location;
wherein:
  the first and second bladders overlie a seat adjustment bladder also positioned within the vehicle seat;
  each of the first and second bladders are rectangular in shape so as to define a lower-inside corner and an upper-outside corner with respective first and second edges extending from the lower-inside corner, the first edge being parallel with the centerline of the seatback, and are arranged to extend diagonally such that the lower inside corner of the second bladder overlaps with the upper outside corner of the first bladder with the respective first edges being parallel to and successively offset from each other away from each other; and
  the massage sequence is implemented in one of a plurality of seat configurations achieved by one of inflation or deflation of the seat adjustment bladder.

15. The method of claim 14, wherein:
the first and second bladders are positioned within a first predetermined area along a seatback of the vehicle seat, the first predetermined area being selected to correspond with a muscle group of the back of an occupant;
the second location is selected to correspond, relative to the first location, with a direction of extension of the muscle group; and
the first and second bladders are inflated sequentially along the direction of extension of the muscle group.

16. The method of claim 14, further including:
after a time interval, causing deflation of the second bladder;
when the second bladder passes the deflation threshold level, causing inflation of a third bladder positioned within the vehicle seat in a third location adjacent and diagonal to the second location.

17. The method of claim 16, further including:
causing inflation, to a second predetermined inflation level, of a third bladder in a third location within the vehicle seat, the third location being spaced apart from the first location;
after a time interval, causing deflation of the third bladder;
when the third bladder passes a second deflation threshold level, causing inflation of a fourth bladder positioned within the vehicle seat in a fourth location adjacent and diagonal to the third location.

18. The method of claim 16, wherein the third bladder is caused to inflate one of simultaneously with the first bladder or after inflation of the second bladder.

* * * * *